United States Patent [19]
Komp et al.

[11] Patent Number: 5,966,901
[45] Date of Patent: *Oct. 19, 1999

[54] PACKAGE DELIVERY DEVICE IN FILLING AND SEALING MACHINES

[75] Inventors: Rainer Komp, Backnang; Andreas Greif, Winnenden, both of Germany

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,731
[22] PCT Filed: Dec. 19, 1996
[86] PCT No.: PCT/DE96/02455
  § 371 Date: Dec. 9, 1997
  § 102(e) Date: Dec. 9, 1997
[87] PCT Pub. No.: WO97/27111
  PCT Pub. Date: Jul. 31, 1997

[30] Foreign Application Priority Data

Jan. 24, 1996 [DE] Germany ............... 196 02 410

[51] Int. Cl.⁶ .................................................. B65B 7/00
[52] U.S. Cl. ............... 53/387.2; 198/626.3; 198/626.5
[58] Field of Search ...................... 493/141, 142, 493/143, 179, 182, 183; 198/626.3, 626.4, 626.5; 53/387.2, 504, 476

[56] References Cited

U.S. PATENT DOCUMENTS

| | | | |
|---|---|---|---|
| 2,922,266 | 1/1960 | Haffner | 53/387.2 |
| 3,354,606 | 11/1967 | Miller et al. | 53/387.2 |
| 3,690,222 | 9/1972 | Schroeder | 53/387.2 |
| 4,230,218 | 10/1980 | Kunzmann | 198/626.4 |
| 4,779,715 | 10/1988 | Pazdernik | 198/626.4 |
| 5,079,982 | 1/1992 | Antonissen | 198/626.5 |
| 5,092,108 | 3/1992 | Gottfreid | 53/387.2 |

*Primary Examiner*—Eugene L. Kim
*Attorney, Agent, or Firm*—Edwin E. Greigg; Ronald E. Greigg

[57] ABSTRACT

A package delivery device of a filling and closing machine has a conveyor belt (31) and above it, spaced apart by the package height, has a top belt (41). To adjust the clearance of the top belt (41) from the conveyor belt (31) to the format height and to compensate for filling level fluctuations of the packages 1, the arrival end of the conveyor belt (31) and the delivery end of the top belt (41) can be adjusted in opposing directions, whereas the arrival end of the top belt (41) and the delivery end of the conveyor belt (31) are stationary. A linear drive (51) produces the vertical adjustment via a common adjusting rod assembly.

3 Claims, 2 Drawing Sheets

PACKAGE DELIVERY DEVICE IN FILLING AND SEALING MACHINES

PRIOR ART

The invention is based on a package delivery device in filling and closing machines. Besides the well-ordered output of just finished packages, this kind of package delivery device is also used to hold down the freshly glued top closure of sacks or collapsible cardboard packages until the applied glue in the top closure has hardened and bonded so that the top closure is secured. In order to adapt the clearance between the conveyor belt and the loaded top belt to the format or the filling level of the packages, in known package delivery devices, the conveyor belt can be vertically adjusted since the closing device of packaging machines works at a constant level. Accordingly, the forwarding conveying devices for the packages must be adapted to the changing vertical position of the conveyor belt of the package delivery device.

ADVANTAGES OF THE INVENTION

The package delivery device according to the invention, with the has the advantage that when being adjusted to changing package heights, despite having a simple and clear structure, it uses its arrival end and its delivery end to easily adapt to the constant arrival and delivery height of the packaging machine and a subsequent conveying device for passing on the packages. The invention has an embodiment with the features set forth hereinafter has particular advantages by means of which, in an adjustment, the adaptation of the arrival end and the delivery end is carried out jointly. The invention set forth herein, moreover, produces a particularly simple construction of the device.

BRIEF DESCRIPTION OF THE DRAWINGS

An exemplary embodiment of the invention is represented in the drawings and is described in detail below.

DESCRIPTION OF THE EXEMPLARY EMBODIMENT

Figure 1:
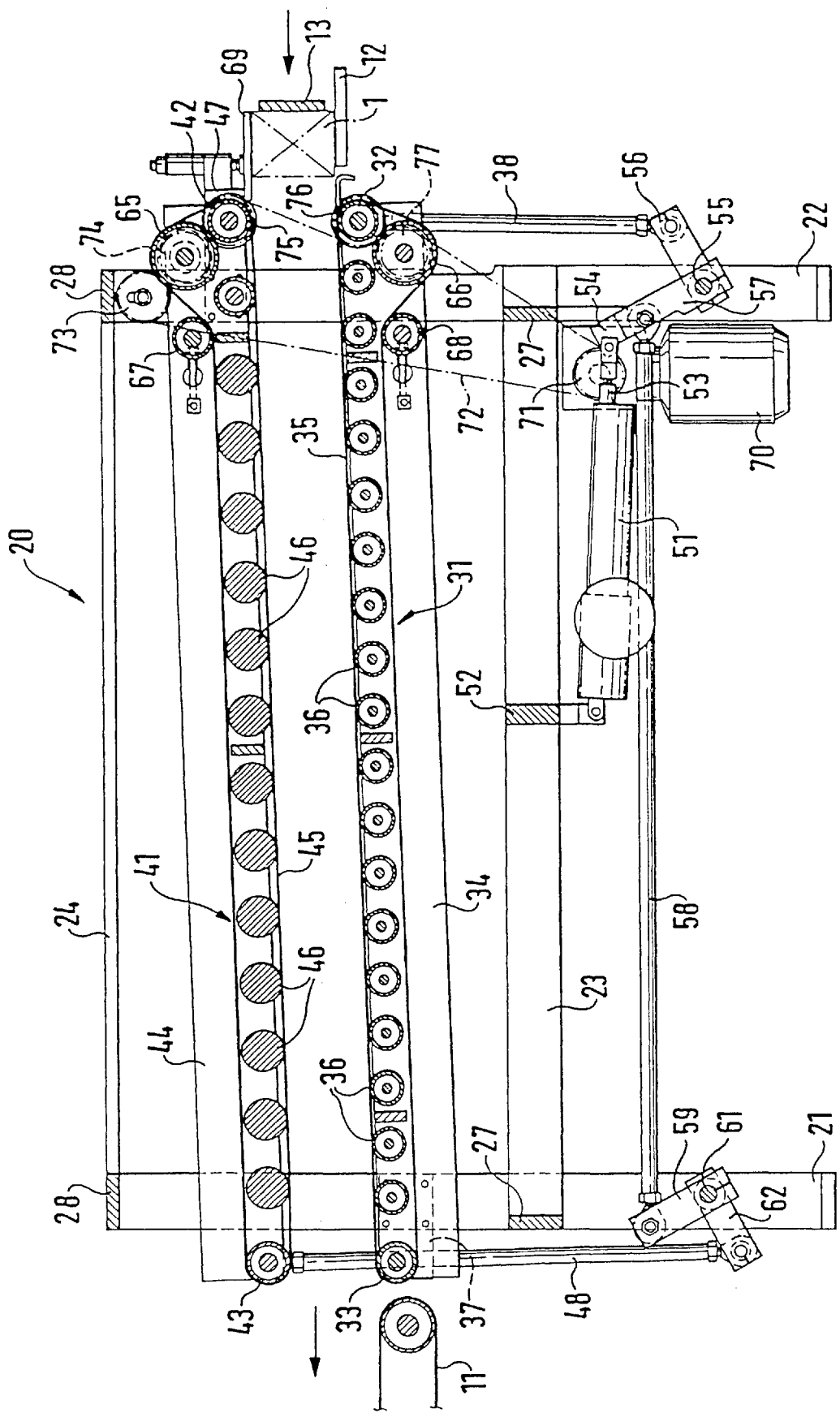
FIGS. 1 and 2 show longitudinal sections through the delivery device in a minimal and maximal setting.

The delivery device constitutes the end of a filling and closing machine for sacks or collapsible cardboard boxes. It ends at a closing device which applies an adhesive or glue for sealing the top closure of the packs or packages 1, and is used to hold the top closure during the bonding time of the adhesive or glue and for transferring the packages 1 to a conveying device 11, for example a multi-pack machine. In the filling and closing machine, on a bottom rail 12, which can be adjusted vertically for regulating fill height and changing format, the packages 1 are transported continuously by carriers 13 of a conveying device and are finally introduced into the delivery device.

The delivery device has a rolling rack 20 that has two similar parallel portal supports, each with a pair of vertical feet which are connected to each other with two longitudinal pairs of bars 23, 24 and two lateral pairs of bars 27, 28. An endless conveyor belt 31 and an endless top belt 41 spaced above it are disposed in the rolling rack 20. The conveyor belt 31 runs via two deflecting rolls 32, 33 which are supported in rotary fashion in the end sections of a longitudinally extended carrying frame 34. The feed side 35 of the conveyor belt 31 oriented toward the top belt 41 is supported by a number of parallel support rolls 36, which are supported in the carrying frame 34 in rotary fashion. On its delivery end, the carrying frame 34 is supported in two catches 37, which protrude at the one portal support 21, so that it can pivot around the axis of the delivery end deflection roll 33 and is supported in hinged fashion on the arrival end by two stilts 38 that are part of an adjusting device.

In a manner similar to the conveyor belt 31, the top belt 41 that covers it runs via two deflection rolls 42, 43, which are supported in rotary fashion in a second carrying frame 44. The feed side 45 of the top belt 41 oriented toward the conveyor belt 31 is loaded by a number of parallel weighted rolls 46, which are supported in the carrying frame 44 in rotary fashion with a lot of play. On its arrival end, this carrying frame 44 is supported in two catches 47, which protrude at the other portal support 22, so that it can pivot around the axis of the arrival end deflection roll 42 and is supported in hinged fashion on the delivery end by two stilts 48.

In order to adjust the clearance of the top belt 41 from the conveyor belt 31 for adapting to the package height, on the one hand, the end of the frame 34 carried by the stilts 38 is raised or lowered with the conveyor belt 31 and on the other hand, the end of the frame 44 carried by the stilts 48 is lowered or raised with the top belt 41 so that the feed sides 35 and 41 that face each other and belong to the conveyor belt 31 and the top belt 41, respectively, are moved toward each other or away from each other in parallel fashion.

This adjustment is carried out by a linear drive 51, for example an electromechanical lifting cylinder or hydraulic cylinder, which is coupled in a traverse 52 between the longitudinal bars 23, 24 of the rolling rack 20. Via a lever 54, the adjusting rod 53 of the linear drive 51 acts on a shaft 55 supported in the portal support 22. On the ends of this shaft 55, there are two levers 56 which are coupled to the stilts 38 that carry the conveyor belt frame 34, as well as a third lever 57 that acts on a shaft 61 in the other portal support 21 via a coupling 58 and an oscillating crank 59. On the ends of this shaft 61, there is a pair of levers 62, which are coupled to the stilts 48 that support the top belt frame 44. The lever lengths of this rod assembly that can be adjusted by the linear drive 51 are dimensioned so that when the adjusting rod 53 of the linear drive 51 travels in the one direction, the arrival end of the conveyor belt frame 31 is lowered and the delivery end of the top belt frame 41 is raised by the same amount and vice versa.

To compensate for the elongation of the conveyor belt 31 and the top belt 41, a loop-forming roll 65 or 66 and a tension roll 67 or 68 are disposed in the respective frame 34 or 44 and pressed against the conveyor belt 31 or the top belt 41 from the outside.

The conveyor belt 31 and the top belt 41 are continuously driven by a drive motor 70 so that their feed sides 35 and 45 oriented toward each other move in the same direction with the same speed from arrival to delivery of the packages 1. An endless chain 72 is used to transmit the rotary motion and is guided in the drive direction by a drive pinion 71 of the drive motor 70 via an elongation compensation pinion 73, a second drive pinion 74 affixed to the drive roll, a deflection roll 75 that rests loosely on the arrival end deflection roll axle 42 of the top belt 41, a deflection roll 76 that rests loosely on the arrival end deflection roll axle 32 of the conveyor belt 31, and a drive pinion 77 on the frame 34, which pinion is affixed to the drive roll.

The conveyor belt 31 and the top belt 41 are driven by the drive motor 70 with a rotating speed that is adapted to the feed velocity of the carriers 13 that belong to the conveying device of the filling and closing machine so that the packages 1 have a small spacing from one another between the conveyor belt 31 and the top belt 41.

The linear drive 51 is correspondingly controlled to adjust the clearance of the top belt 41 from the conveyor belt 31 for a particular format height. In addition, it is continuously controlled by the filling height regulation of the filling and closing machine so that the clearance between the conveyor belt 31 and the top belt 41 is adapted to the respective height of the packages.

Figure 2:
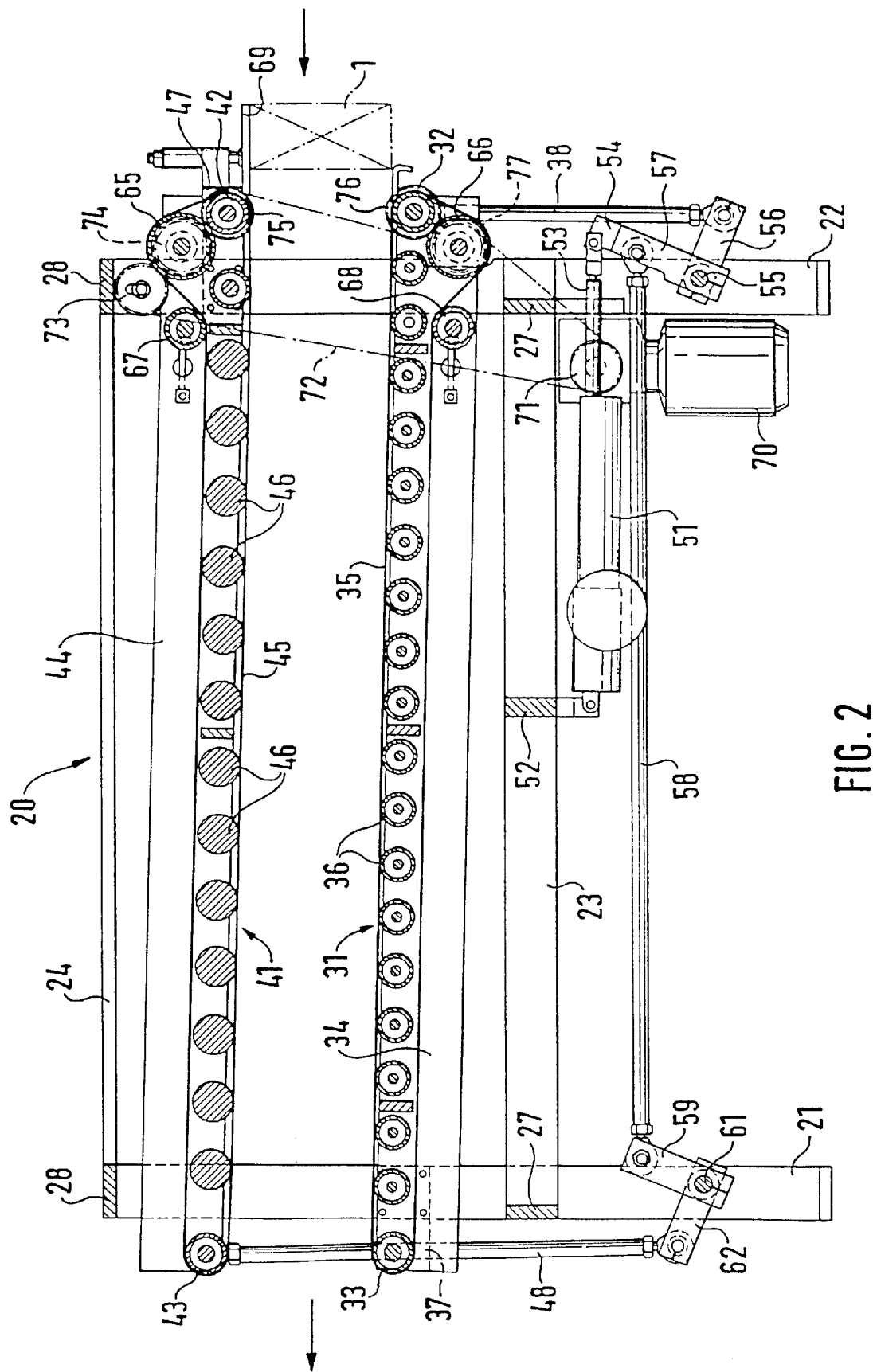

The above-described delivery device from a filling and closing machine is shown with minimal height in FIG. 1 and with maximal height in FIG. 2. The device can be smoothly adjusted to other positions between these two positions. It is common to all of these positions that the upper edge on the arrival end, which edge adjoins a pressing strip 69 of the filling and closing machine, and the lower edge on the delivery end always have the same constant height.

The foregoing relates to preferred exemplary embodiments of the invention, it being understood that other variants and embodiments thereof are possible within the spirit and scope of the invention, the latter being defined by the appended claims.

The invention claimed and desired to be secured by Letters Patent of the United Stated is:

1. A package delivery device of a filling and closing machine, comprising a continuously driven conveyor belt (31) supported by a plurality of support rolls (36), a feed side (35) that carries the packages (1) that extend essentially in a horizontal plane between a first deflection roll (32) on an arrival end and a second deflection roll (33) on a delivery end, an endless top belt (41), said endless top belt is disposed above the conveyor belt (31) and has a weight-loaded feed side (45) including weighted rolls (46), said weight-loaded feed side extends between a third deflection roll (42) on the arrival end and a fourth deflection roll (43) on the delivery end and rests on top of the packages (1), the weight loaded side feed is spaced apart from the level of the packages (1) and proceeds via the feed side (35) of the conveyor belt (31) that carries the packages, an adjusting device for adjusting a clearance of the top belt (41) from the conveyor belt (31) according to a height of the packages (1), the first deflection roll (32) of the conveyor belt (31) on the arrival end is vertically adjustable, the second deflection roll (33) of the conveyor belt (31) on the delivery end is fixed vertically, the third deflection roll (42) of the top belt (41) on the arrival end is fixed vertically, and the fourth deflection roll (43) of the top belt (41) on the delivery end is vertically adjustable whereby the conveyor belt and the endless top belt are simultaneously adjusted by said adjusting device so that the conveyor belt and the endless top belt remain substantially parallel with each other.

2. A package delivery device according to claim 1, in which the first and second deflection rolls (32, 33) and support rolls (36) of the conveyor belt (31) are carried by a first frame (34), which pivots around the conveyor belt (31) on the delivery end, and that the third and fourth deflection rolls (42, 43) of the top belt (41) as well as the weighted rolls (46) that load the top belt (41) are carried by a second frame (44) which pivots around the rotational axis of the third deflection roll (42) of the top belt (41) on the arrival end, and said first frame and said second frame are simultaneously adjusted by said adjusting device.

3. The package delivery device according to claim 2, in which a vertically adjustable end of the first frame (34) with the first deflection roll (32) for the conveyor belt (31) on the arrival end and a vertically adjustable end of the second frame (44) with the third deflection roll (42) for the top belt (41) on the delivery end are connected to each other via an adjusting rod assembly (53 to 62) of said adjusting device which is connected to a linear drive (51) for simultaneously adjusting said conveyor belt and said endless top belt substantially parallel with each other.

\* \* \* \* \*